US008839646B2

(12) United States Patent
Haruna et al.

(10) Patent No.: US 8,839,646 B2
(45) Date of Patent: Sep. 23, 2014

(54) METHOD FOR PRODUCING OPTICAL FIBER PREFORM

(75) Inventors: Tetsuya Haruna, Yokohama (JP);
Masaaki Hirano, Yokohama (JP);
Yoshiaki Tamura, Yokohama (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 327 days.

(21) Appl. No.: 13/356,984

(22) Filed: Jan. 24, 2012

(65) Prior Publication Data

US 2012/0192593 A1    Aug. 2, 2012

(30) Foreign Application Priority Data

Jan. 27, 2011    (JP) ................. 2011-015287

(51) Int. Cl.
*C03C 25/60*    (2006.01)
*C03B 37/018*    (2006.01)
*C03B 37/014*    (2006.01)
*C03B 37/012*    (2006.01)

(52) U.S. Cl.
CPC ....... *C03B 37/01211* (2013.01); *C03B 2201/07* (2013.01); *C03B 37/01861* (2013.01); *C03B 37/01807* (2013.01); *C03B 2201/50* (2013.01); *C03B 37/01413* (2013.01); *C03B 2201/20* (2013.01); *C03B 37/01869* (2013.01); *C03B 2201/12* (2013.01)
USPC ......................................................... 65/430

(58) Field of Classification Search
CPC ............ C03B 2201/07; C03B 2201/12; C03B 2201/20; C03B 2201/50; C03B 37/01413; C03B 37/01807; C03B 37/01861; C03B 37/01869

See application file for complete search history.

(56) References Cited

U.S. PATENT DOCUMENTS

| 7,536,076 B2 * | 5/2009 | Khrapko et al. ............... 385/142 |
| 2003/0221459 A1 * | 12/2003 | Walczak ........................ 65/398 |
| 2005/0063663 A1 | 3/2005 | Anderson et al. |

FOREIGN PATENT DOCUMENTS

| JP | 2007-504080 | 3/2007 |
| WO | WO 2004/020357 A2 | 3/2004 |
| WO | WO 2005/021455 A2 | 3/2005 |
| WO | WO 2007/149344 A1 | 12/2007 |
| WO | WO 2008/106046 A1 | 9/2008 |

* cited by examiner

*Primary Examiner* — Queenie Dehghan
(74) *Attorney, Agent, or Firm* — Drinker Biddle & Reath LLP

(57) ABSTRACT

There is provided a method for producing an optical fiber preform used in producing an optical fiber having low attenuation. The production method includes (1) a rod formation step of forming a glass rod of a silica glass containing an alkali metal element, the average concentration of the alkali metal element being 5 at·ppm or more, (2) a heat treatment step of heat-treating the glass rod, (3) a core part formation step of forming an alkali metal element-free silica glass layer having a chlorine concentration of 6000 at·ppm or more around the perimeter of the glass rod heat-treated in the heat treatment step to form a core part including the glass rod and the silica glass layer, and (4) a cladding part formation step of forming a cladding part of a silica-based glass having a lower refractive index than the core part around the perimeter of the core part.

7 Claims, 8 Drawing Sheets

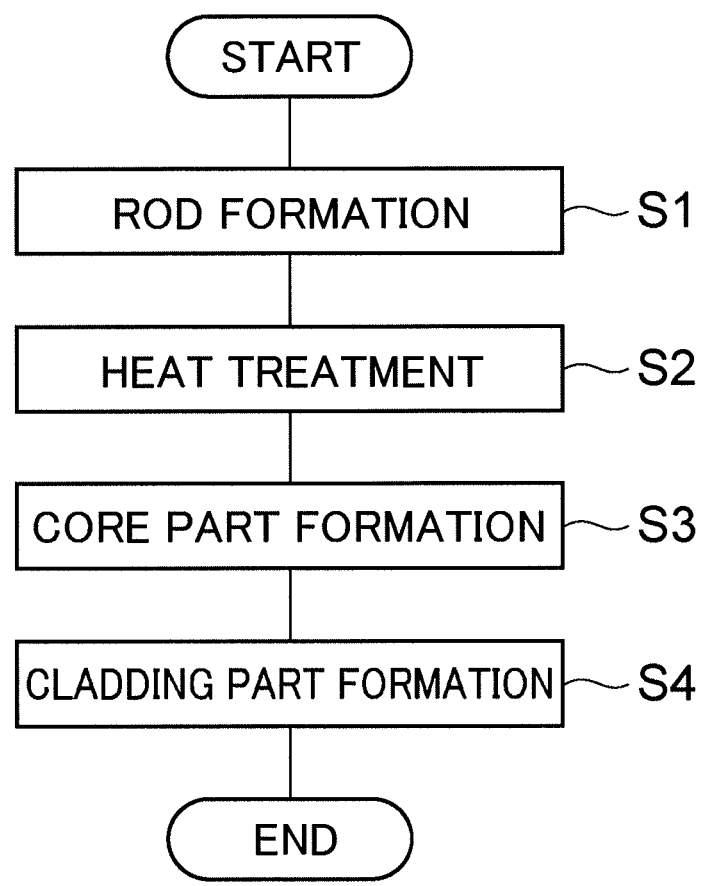

METHOD FOR PRODUCING OPTICAL FIBER PREFORM

BACKGROUND OF THE INVENTION

1. Field of the Invention

The present invention relates to a method for producing an optical fiber preform.

2. Description of the Related Art

Japanese Unexamined Patent Application Publication (Translation of PCT Application) No. 2007-504080 describes an optical fiber composed of a silica-based glass and having a core doped with an alkali metal. It is stated that the doping of the alkali metal in a core allows the viscosity of the core to be reduced when an optical fiber preform is drawn into an optical fiber, and allows the relaxation of the network structure of the silica glass to proceed; hence, the optical fiber has low attenuation.

As a method for doping a silica-based glass with an alkali metal, a diffusion method is known. The diffusion method is one in which a glass pipe composed of the silica-based glass is heated with an external heat source or a plasma is generated in the glass pipe while the vapor of an alkali metal or alkali metal salt, which serves as a raw material, is fed into the glass pipe, thereby doping the inner surface of the glass pipe with the alkali metal element by diffusion.

After the glass pipe is doped with the alkali metal, the diameter of the resulting glass pipe is reduced. After the reduction in diameter, the inner surface of the glass pipe is etched to remove transition metals, such as Ni and Fe, which are contaminated during the doping of the glass pipe with the alkali metal element. After the etching, the glass pipe is collapsed to form an alkali metal-doped core rod. A cladding part is formed on the outside of the alkali metal-doped core rod to produce an optical fiber preform. The optical fiber preform is drawn to produce an optical fiber. In a glass body doped with an alkali metal element, such as potassium, by a vapor deposition process, some alkali metal element atoms in the glass react with oxygen forming the glass or chlorine into oxide or chloride.

Japanese Unexamined Patent Application Publication (Translation of PCT Application) No. 2007-504080 states that in order to achieve low scattering loss, most desirably, the optical fiber preform is subjected to heat treatment at 1600° C. for 30 hours. Under the conditions, however, voids or crystals originated from the alkali metal element are likely to form. An optical fiber produced by drawing the optical fiber preform has high attenuation.

SUMMARY OF THE INVENTION

Accordingly, it is an object of the present invention to provide a method for producing an optical fiber preform used for the production of an optical fiber having low attenuation.

To achieve the object, the present invention provides a method for producing an optical fiber preform including (1) a rod formation step of forming a glass rod composed of a silica glass containing an alkali metal element, the average concentration of the alkali metal element being 5 at·ppm or more, (2) a heat treatment step of heat-treating the glass rod, (3) a core part formation step of forming an alkali metal element-free silica glass layer having a chlorine concentration of 6000 at·ppm or more around the perimeter of the glass rod heat-treated in the heat treatment step to form a core part including the glass rod and the silica glass layer, and (4) a cladding part formation step of forming a cladding part composed of a silica-based glass having a lower refractive index than the core part around the perimeter of the core part.

In the heat treatment step, preferably, the glass rod is heat-treated at a temperature higher than 800° C. and 1400° C. or lower. In the heat treatment step, preferably, the glass rod is heat-treated over a period of 8 hours to 20 hours. In the rod formation step, preferably, the glass rod has a chlorine concentration of 400 at·ppm or less. In the rod formation step, preferably, the alkali metal element is one element selected from potassium, sodium, rubidium, and cesium. In the core part formation step, the silica glass layer preferably has a chlorine concentration of either 6000 at·ppm to 14,000 at·ppm or 8000 at·ppm to 17,000 at·ppm.

According to the present invention, it is possible to produce an optical fiber preform for the production of an optical fiber having low attenuation.

BRIEF DESCRIPTION OF THE DRAWINGS

FIG. 1 illustrates a flowchart of a method for producing an optical fiber preform according to an embodiment of the present invention.

DESCRIPTION OF THE PREFERRED EMBODIMENTS

Figure 2A:
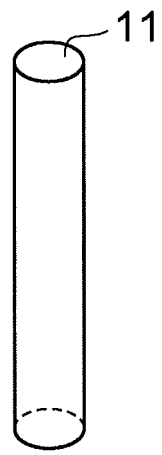
FIGS. 2A to 2D are conceptual drawings illustrating the steps in the production method according to the embodiment as illustrated in FIG. 1.
Figure 2B:
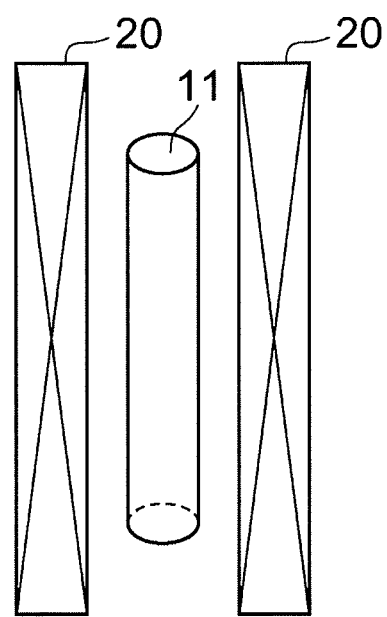
Figure 2C:
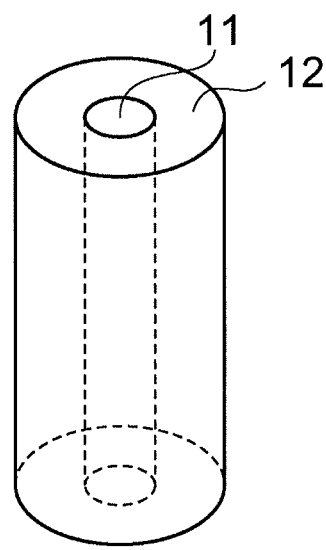
Figure 2D:
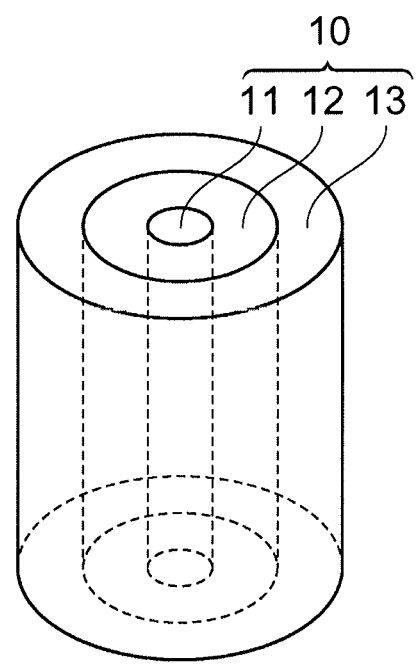

Embodiments of the present invention will be described below with reference to the attached drawings. The embodiments are provided solely for purposes of illustration and are not intended to be limitative. In the drawings, the same elements are designated using the same reference numerals, and descriptions are not redundantly repeated. The ratios of dimensions in the drawings are not always accurate.

Potassium is easily bonded to chlorine. It is thus presumed that when free potassium in glass diffuses at 1500° C. or higher in a production process and reaches a glass containing a large amount of chlorine, potassium chloride is formed there. The resulting potassium chloride presumably causes the formation of voids and crystals. The present invention is based on the consideration.

FIG. 1 illustrates a flowchart of a method for producing an optical fiber preform according to an embodiment of the present invention. The production method according to this embodiment includes a rod formation step S1, a heat treatment step S2, a core part formation step S3, and a cladding part formation step S4. These steps are sequentially performed to produce an optical fiber preform. FIGS. 2A to 2D are conceptual drawings illustrating the steps in the production method according to this embodiment.

In the rod formation step S1, a glass rod 11 composed of a silica-based glass containing an alkali metal element is formed, the average concentration of the alkali metal element being 5 at·ppm or more. The glass rod 11 preferably has a chlorine concentration of 400 at·ppm or less. The alkali metal element is preferably one element selected from potassium, sodium, rubidium, and cesium.

In the heat treatment step S2, the glass rod 11 is subjected to heat treatment with a heat source 20. The heat treatment is preferably performed at a temperature of higher than 800° C. and 1400° C. or lower over a period of 8 hours to 20 hours. As the heat source 20, any one of induction furnaces, resistance furnaces, and oxyhydrogen burners may be used.

In the core part formation step S3, an alkali metal element-free silica glass layer 12 having a chlorine concentration of 6000 at·ppm or more is formed around the perimeter of the heat-treated glass rod 11 to form a core part including the glass rod 11 and the silica glass layer 12. The silica glass layer 12 preferably has a chlorine concentration of either 6000 at·ppm to 14,000 at·ppm or 8000 at·ppm to 17,000 at·ppm. A chlorine concentration of 6000 at·ppm to 14,000 at·ppm is preferable to prevent formation of voids and crystals and a chlorine concentration of 8000 at·ppm to 17,000 at·ppm is preferable to reduce attenuation.

In the cladding part formation step S4, a cladding part 13 composed of a silica-based glass having a lower refractive index than that of the core part is formed around the perimeter of the core part. Thereby, an optical fiber preform 10 is produced. The optical fiber preform 10 is drawn to produce an optical fiber.

Figure 3:
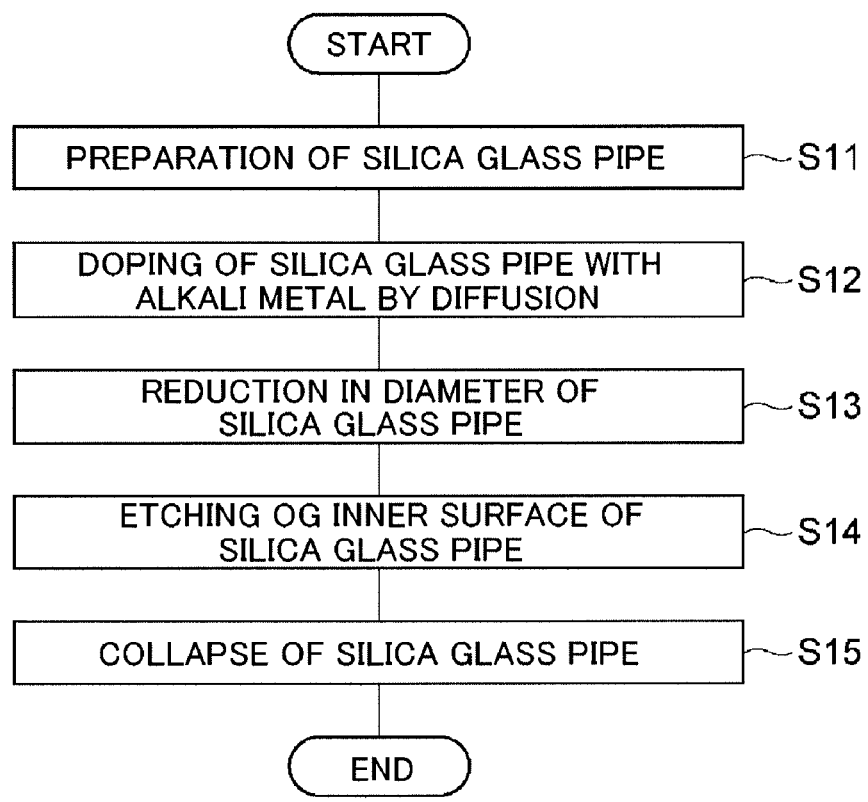
FIG. 3 illustrates a flowchart of the substeps of the rod formation step in the production method according to the embodiment as illustrated in FIG. 1.

The rod formation step S1 includes substeps S11 to S15. FIG. 3 illustrates a flowchart of the substeps of the rod formation step in the method for producing an optical fiber preform according to this embodiment. In the rod formation step, substeps S11 to S15 are sequentially performed to form the glass rod 11 containing alkali metal element.

In substep S11, a starting glass pipe composed of a silica-based glass is prepared. The starting glass pipe is preferably composed of a pure silica glass but may contain a halogen inevitably added during the production. The starting glass pipe is formed into the core (or part of the core) of the optical fiber.

Figure 4:
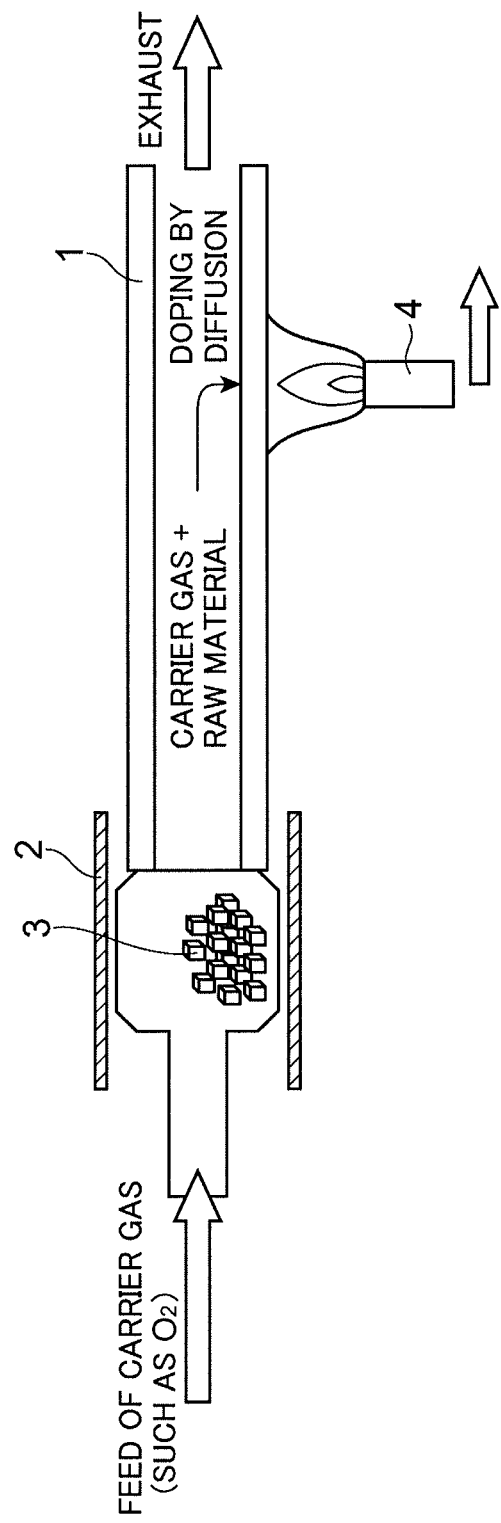
FIG. 4 is a conceptual drawing illustrating the alkali metal addition substep illustrated in FIG. 3.

Substep S12 is an alkali metal addition substep of doping the starting glass pipe with an alkali metal. FIG. 4 is a conceptual drawing illustrating the alkali metal addition substep. In substep S12, the gas of an alkali metal raw material 3 heated with a heat source 2 (for example, an electric furnace or burner) is fed into the starting glass pipe 1 together with a carrier gas (for example, $O_2$ gas). Simultaneously, the glass pipe 1 is heated with an external heat source 4 (for example, a thermal plasma or an oxyhydrogen flame). Thereby, the glass pipe 1 is subjected to diffusion doping with the alkali metal from its inner surface.

In substep S13, the glass pipe is heated to reduce the diameter. In substep S14, transition metals, such as Ni and Fe, which are contaminated during the doping of the glass pipe with the alkali metal element, are removed by etching the inner surface of the glass pipe. In step S15, the glass pipe is collapsed by heating, thereby forming an alkali metal-doped glass rod.

Conditions in specific examples (examples and comparative examples) of a method for producing an optical fiber will be described below. In addition, the evaluation results of optical fiber preforms and optical fibers produced by the method will be described below. Table I summarizes the production conditions and the evaluation results of examples and comparative examples.

TABLE I

| | $C_{Cl\,pipe}$ ppm | $D_{K50}$ mm | Heat treatment conditions Temperature °C. | Time hour | Silica glass layer Presence or absence/ $C_{Cl\,perimeter}$ at. ppm | $C_{alkali}$ at. ppm |
|---|---|---|---|---|---|---|
| Example 1 | 400 | 7 | 1000 | 8 | present/13000 | 5 |
| Example 2 | 400 | 9 | 1000 | 8 | present/3000 | 5 |
| Example 3 | 400 | 8 | 1000 | 8 | present/6000 | 5 |
| Example 4 | 100 | 9 | 1000 | 8 | present/13000 | 15 |
| Example 5 | 50 | 9 | 1400 | 1.5 | present/13000 | 15 |
| Example 6 | 50 | 10.5 | 1200 | 1.5 | present/13000 | 15 |
| Example 7 | 400 | 10 | 1000 | 8 | present/13000 | 15 |
| Example 7' | 700 | 10.5 | 1000 | 8 | present/13000 | 15 |
| Example 8 | 700 | 10 | 1000 | 8 | present/13000 | 25 |
| Example 9 | 400 | 11 | 1000 | 8 | present/13000 | 25 |
| Example 10 | 100 | 11 | 1000 | 8 | present/13000 | 25 |
| Example 11 | 100 | 9 | 800 | 60 | present/13000 | 25 |
| Example 12 | 50 | 10 | 900 | 60 | present/13000 | 25 |
| Example 13 | 50 | 7 | 1000 | 20 | present/13000 | 25 |
| Example 14 | 50 | 10 | 1000 | 60 | present/13000 | 25 |
| Example 15 | 50 | 10 | 1100 | 15 | present/13000 | 25 |
| Example 16 | 50 | 10.5 | 1200 | 20 | present/13000 | 25 |
| Example 17 | 50 | 11 | 1200 | 30 | present/13000 | 25 |
| Comparative Example 1 | 100 | 7 | — | | absent | 5 |
| Comparative Example 2 | 100 | 8 | — | | present/13000 | 5 |

The starting glass pipe prepared in substep S11 contained 50 at·ppm to 700 at·ppm chlorine (values of Chlorine concentration $C_{Cl\,pipe}$ in starting glass pipe in examples are described in Table I) and 5000 at·ppm fluorine, which served as dopants. The concentration of other impurities in the starting glass pipe was 10 at·ppm or less. Thus, the starting glass pipe was composed of substantially pure silica glass. The starting glass pipe had an outside diameter of about 35 mm and an inside diameter of about 20 mm.

In substep S12, as the alkali metal raw material, potassium bromide (KBr) was used. Potassium bromide was heated to 700° C. to 800° C. with the external heat source to produce KBr vapor. The starting glass pipe was heated with a thermal plasma flame serving as the external heat source while the KBr vapor was fed into the starting glass pipe together with oxygen serving as a carrier gas fed at a flow rate of 1 SLM (1 liter/min in standard conditions) and the plasma flame was moved at a speed of 30 mm/min along the pipe back and forth 30 times in such a manner that the temperature of the outer surface of the starting glass pipe was 2050° C., thereby doping the inner surface of the starting glass pipe with metallic element potassium by diffusion.

In substep S13, the glass pipe was heated with a thermal plasma flame serving as the external heat source while oxygen flowed (at 2 SLM) into the glass pipe doped with metallic element potassium and the plasma flame was moved at a speed of 40 mm/min along the pipe back and forth 5 times in such a manner that the temperature of the outer surface of the glass pipe was 2100° C., thereby doping the inner surface of the metallic element potassium-doped glass pipe with molecular oxygen by diffusion. Simultaneously, the inside diameter of the metallic element potassium-doped glass pipe was reduced to 3 mm.

In substep S14, the glass pipe doped with metallic element potassium and molecular oxygen was heated with the external heat source while $SF_6$ (at 0.05 SLM) and oxygen (at 1 SLM) were fed into the glass pipe, thereby performing dry etching to increase the inside diameter of the glass pipe to 3.4 mm.

In substep S15, the glass pipe was collapsed by reducing the absolute pressure in the glass pipe to 1 kPa with oxygen fed into the glass pipe (at 1 SLM) and heating the glass pipe with the external heat source in such a manner that the surface temperature of the glass pipe was 1400° C., thereby providing a glass rod (alkali metal-doped glass rod) having an outside diameter of 28 mm and being composed of a silica-based glass containing an alkali metal element.

Glass rods each composed of a silica-based glass containing an alkali metal element were formed by the foregoing rod formation step S1 including substeps S11 to S15. In Example 13 and Comparative Examples 1 and 2, the resulting glass rods were subsequently elongated (at a heating temperature between 1400° C. and 1500° C. for 0.1 hours at the time of drawing). In each of the examples and the comparative examples, the glass rod had a molecular oxygen concentration of 115 ppb at a maximum and a peak potassium concentration of 3500 ppm. Furthermore, the diameter $D_{K50}$ of a portion of the glass rod having a potassium concentration of 50 ppm or more immediately before heat treatment is described in Table I.

Subsequently, in the heat treatment step S2, the glass rods were heat-treated at 800° C. to 1400° C. for 1.5 to 60 hours (values in examples are described in Table I). In the core part formation step S3, silica glass layers having chlorine concentrations described in Table I were formed around perimeters of the respective heat-treated glass rods, thereby forming core parts. After the formation of the silica glass layers, the core parts had average alkali element concentrations Caw, described in Table I (note that in Comparative Example 1, a silica glass layer was not attached, so the alkali metal-doped glass rod was used as the core part). In the cladding part formation step S4, cladding parts formed around perimeters of the respective core parts were composed of a silica-based glass containing fluorine. The optical fiber preforms were produced under these conditions, and then the resulting optical fiber preforms were drawn to produce optical fibers.

Figure 5:
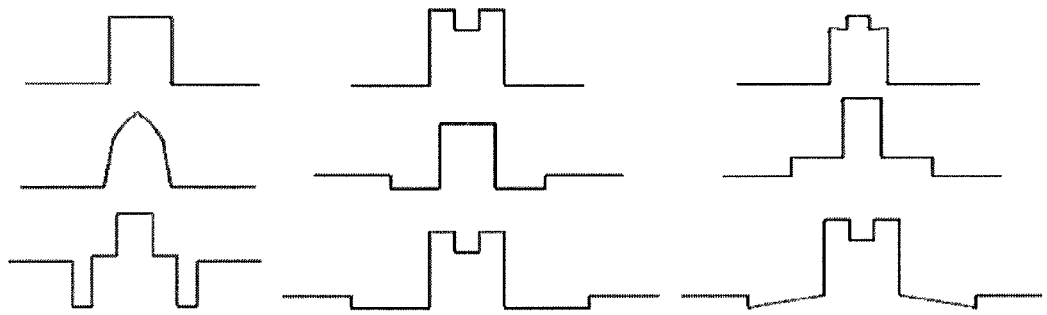
FIG. 5 is a conceptual drawing illustrating an exemplary refractive index profile of an optical fiber preform produced by a production method according to an embodiment of the present invention.

Each core part may have a diameter of 6 to 20 μm. The relative refractive index difference between each core part and the corresponding cladding part may be in the range of 0.2% to 0.5%. In the case where a silica-based glass is used in which the cladding part contains fluorine and has a lower average refractive index than the core part doped with halogens of chlorine and fluorine and an alkali metal element and in which the concentration of the halogens is the highest of all the concentrations of the dopants, the attenuation is reduced. Furthermore, each of the optical fiber preform for an optical fiber and the core part and the cladding part of the optical fiber may have a refractive index profile. Examples of the refractive index profile include, but are not limited to, profiles as illustrated in FIG. 5.

Figure 6:
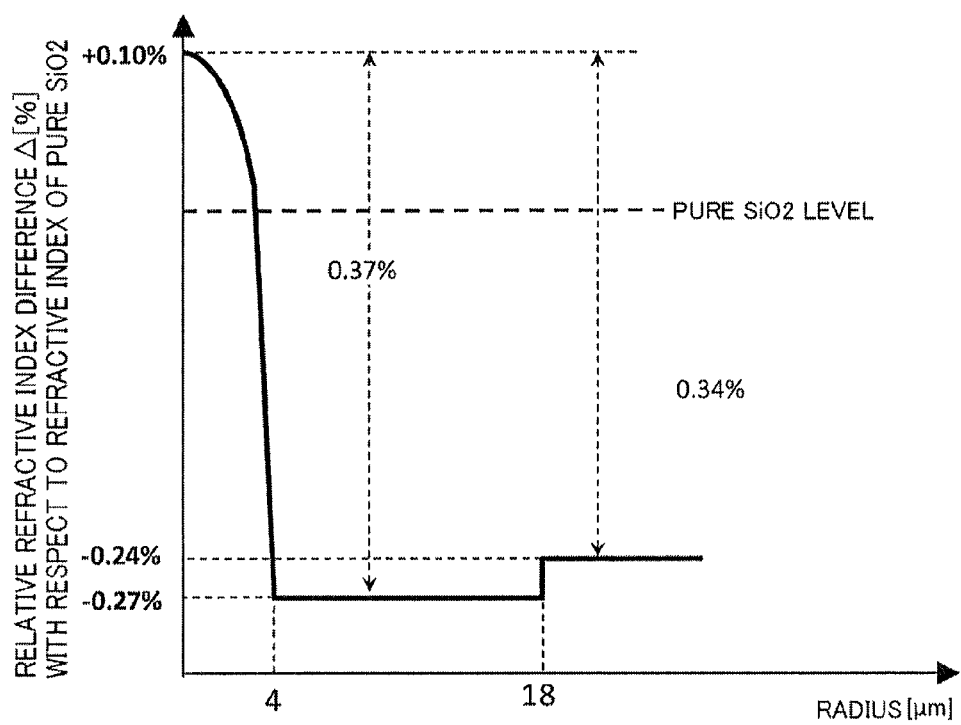
FIG. 6 is a graph illustrating the refractive index profile in Example 7.
Figure 7:
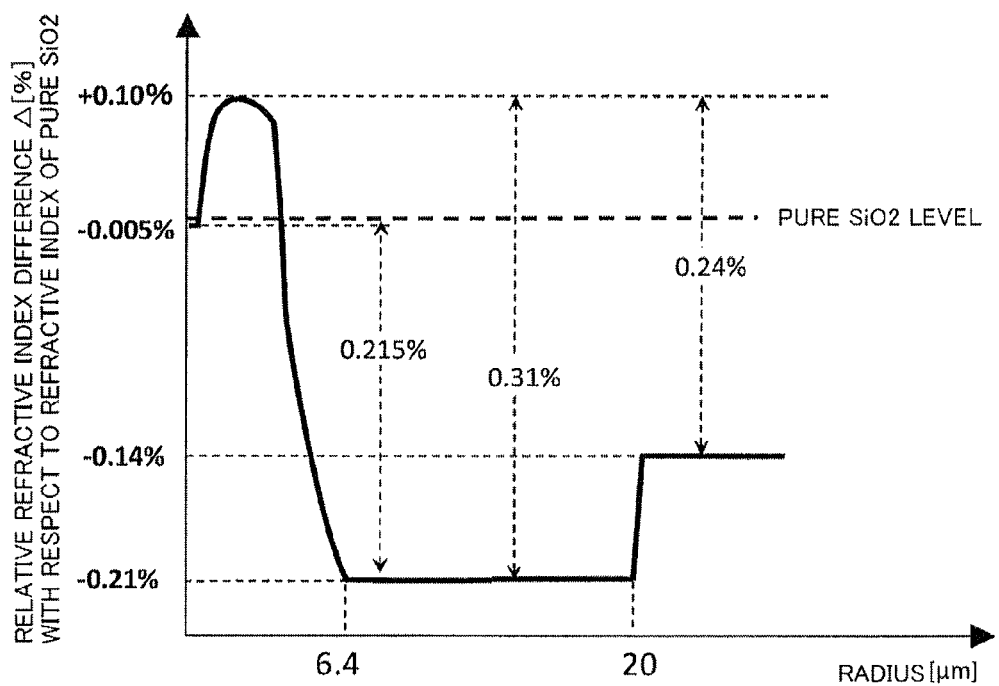
FIG. 7 is a graph illustrating the refractive index profile in Example 15.

FIG. 6 is a graph illustrating a refractive index profile in Example 7. FIG. 7 is a graph illustrating a refractive index profile in Example 15. The relative refractive index difference that lies on the vertical axis of the graph indicates a relative value with respect to the refractive index of pure $SiO_2$, i.e., $$\frac{\Delta_{object} - \Delta_{SiO_2}}{\Delta_{SiO_2}}$$

In Example 15, the optical fiber preform having an outside diameter of 145 mm was drawn at a draw speed of 2300 m/min and an applied tension of 50 g. The optical properties of the optical fibers in Examples 7 and 15 are described in Table II. Both the optical fibers had low attenuation.

TABLE II

|  | Example 7 | Example 15 |
|---|---|---|
| Average K concentration in core at. ppm | 15 | 25 |
| Attenuation at 1300 nm dB/km | 0.280 | 0.280 |
| at 1380 nm dB/km | 0.320 | 0.320 |
| at 1550 nm dB/km | 0.162 | 0.156 |
| Chromatic dispersion at 1550 nm ps/nm²/km | +16.3 | +21.1 |
| Dispersion slope at 1550 nm ps/nm²/km | +0.057 | +0.061 |
| Aeff at 1550 nm μm² | 84 | 141 |
| MFD at 1550 nm μm | 10.5 | 12.8 |
| Cutoff wavelength of optical fiber (2 m) nm | 1310 | 1580 |
| Cable cutoff wavelength (2 m) nm | 1210 | 1480 |
| PMD (C- and L-band) ps/√km | 0.01 | 0.01 |
| Nonlinear coefficient (wavelength: 1550 nm, random polarization) $(W \cdot km)^{-1}$ | 0.6 | 0.6 |

Table III illustrates the results of appearance evaluation of the optical fiber preforms produced under different conditions and the attenuation, at a wavelength of 1550 nm, of optical fibers produced by drawing the optical fiber preforms. Void nucleation sites in Comparative Examples 1 and 2 were located at the boundaries between the alkali metal-doped glass rods and the cladding parts.

TABLE III

| | Preform immediately before drawing | | | | |
|---|---|---|---|---|---|
| | Step causing crystal formation | Potassium concentration (peak value) at. ppm | Number of voids and crystals formed/100 mm | Diameter mm | Attenuation at 1550 nm dB/km |
| Example 1 | — | 600 | 0 | 125 | 0.167 |
| Example 2 | — | 600 | 0 | 125 | 0.185 |
| Example 3 | — | 600 | 0 | 125 | 0.172 |
| Example 4 | — | 1200 | 0 | 130 | 0.168 |
| Example 5 | Heat treatment | 1200 | Entirely crysterized | 130 | — |
| Example 6 | Cladding part formation | 1400 | 2 to 3 | 10.5 | 0.168 |
| Example 7 | — | 1200 | 0 | 145 | 0.162 |
| Example 7' | Cladding part formation | | 3 to 4 | 145 | 0.165 |
| Example 8 | Cladding part formation | 2500 | 3 to 4 | 145 | 0.165 |
| Example 9 | Cladding part | 3000 | 2 to 3 | 145 | 0.168 |

TABLE III-continued

|  | | Preform immediately before drawing | | | |
|---|---|---|---|---|---|
|  | Step causing crystal formation | Potassium concentration (peak value) at. ppm | Number of voids and crystals formed/100 mm | Diameter mm | Attenuation at 1550 nm dB/km |
| | formation | | | | |
| Example 10 | — | 3500 | 0 | 145 | 0.156 |
| Example 11 | Cladding part formation | 3000 | 2 to 3 | 135 | 0.172 |
| Example 12 | — | 3500 | 0 | 150 | 0.160 |
| Example 13 | — | 3200 | 0 | 150 | 0.154 |
| Example 14 | Heat treatment | 3500 | 3 to 4 | 145 | 0.162 |
| Example 15 | — | 3000 | 0 | 150 | 0.156 |
| Example 16 | — | 3500 | 0 | 150 | 0.157 |
| Example 17 | Heat treatment | 3500 | 3 to 4 | 145 | 0.162 |
| Comparative Example 1 | Cladding part formation | 600 | 4 to 5 | 135 | 0.195 |
| Comparative Example 2 | Cladding part formation | 600 | 4 to 5 | 135 | 0.173 |

Examples 1 to 3 demonstrate the following: In the core part formation step S3, a higher chlorine concentration in the silica glass layer which is formed as a part of the core part results in the optical fiber having lower attenuation. To achieve an attenuation of 0.175 dB/km or less at a wavelength of 1550 nm, the silica glass layer preferably has a chlorine concentration of 6000 at·ppm or more.

Examples 7 and 7' demonstrate the following: A lower chlorine concentration in the silica glass doped with potassium in the rod formation step S1 results in further inhibition of the formation of voids and crystals in the glass. Preferably, the silica glass has a chlorine concentration of 400 at·ppm or less.

Examples 4 to 6, 10, and 11 demonstrate the following: a heat treatment temperature of the glass rod of 1200° C. or lower (preferably 1000° C.) in the heat treatment step S2 results in the inhibition of the formation of voids and crystals in the heat treatment step S2. However, a heat treatment temperature of 800° C. causes the formation of voids and crystals in the steps subsequent to the core part formation step S3. Thus, the heat treatment temperature is preferably 1000° C.

Examples 8 to 10 demonstrate the following: In the case where the core part has an average potassium concentration of 25 at·ppm, which is a relatively high concentration, when the potassium-doped glass rod is formed in the rod formation step S1, voids or crystals are formed in the core part at a high chlorine concentration of at least 700 at·ppm. The voids and crystals lead to nonuniformity in the diameter of the glass fiber in the drawing step or an increase in local loss after the drawing step. Thus, in the case where the core part has an average potassium concentration of 25 at·ppm or more, the potassium doped-glass preferably has a chlorine concentration of 100 at·ppm or less.

Examples 10 to 17 demonstrate the following: In the heat treatment step S2, the heat treatment time of the core part is preferably in the range of 8 to 20 hours at 1000° C. to 1200° C. At 30 hours, crystals or voids can be formed.

Examples 1 to 17 and Comparative Examples 1 and 2 demonstrate the following When the heat treatment step S2 is not performed, many voids or crystals are formed in the core part in the cladding part formation step after the formation of the core part. When the heat treatment is performed, potassium atoms (free potassium atoms) that do not react with $SiO_2$ in the glass among potassium atoms incorporated in the glass in the rod formation step S1 are removed from the glass or react with Si or O in the glass in the heat treatment step S2. In contrast, when the heat treatment step S2 is not performed, potassium atoms (free potassium atoms) that do not react with $SiO_2$ in the glass are present in the free state and then are formed into potassium chloride molecules at the time of heating in the subsequent steps to cause the formation of voids. Furthermore, the potassium chloride molecules serve as crystallization nuclei to cause the crystallization of the glass. Thus, the heat treatment of the potassium-doped glass is absolutely required.

Figure 8:
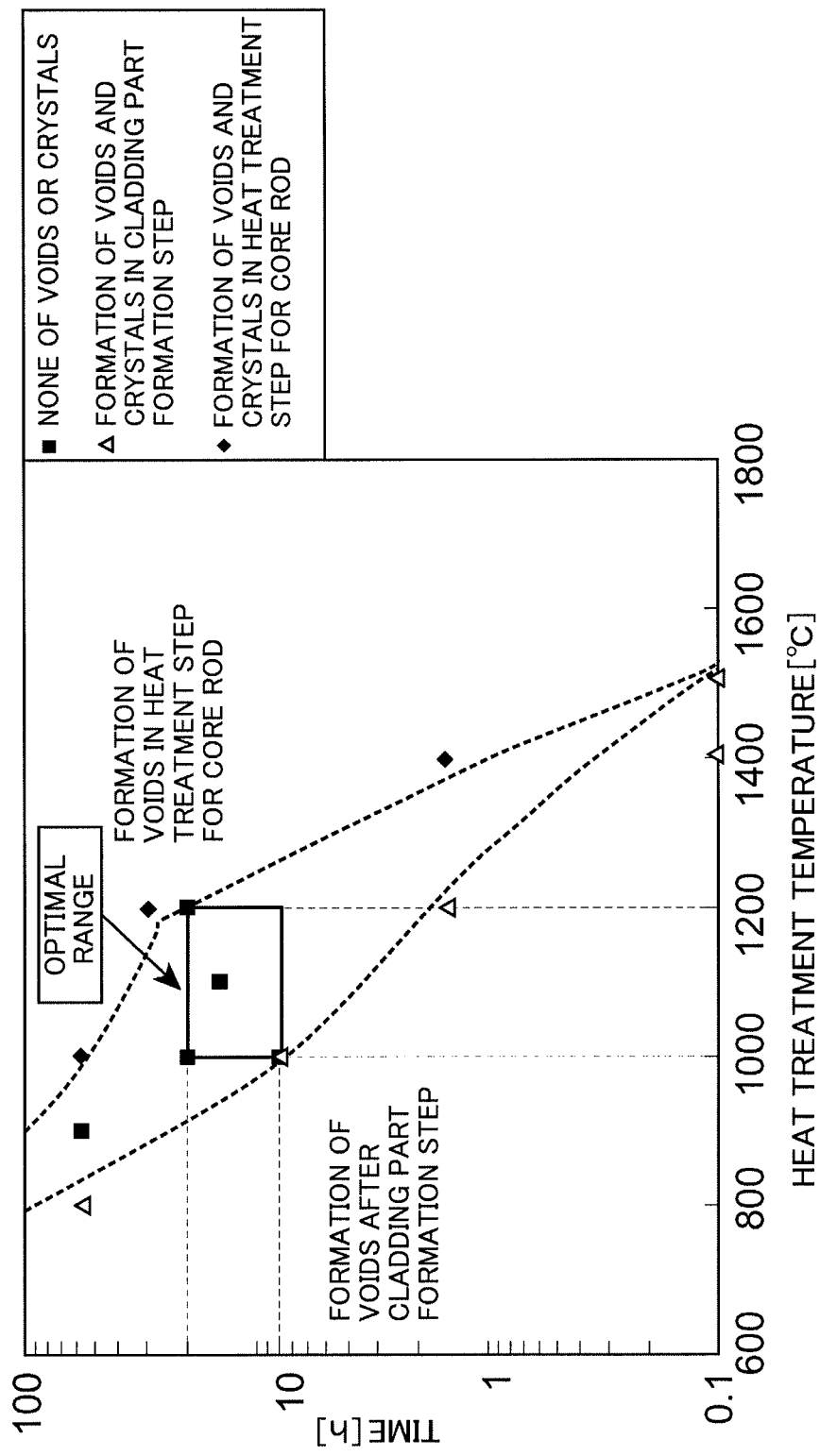
FIG. 8 is a conceptual drawing illustrating the relationship between the formation of voids and crystals and the temperature and time in the heat treatment step in the production method according to the embodiment illustrated in FIG. 1.

FIG. 8 is a conceptual drawing illustrating the relationship between the formation of voids and crystals and the temperature and time in the heat treatment step S2 in the production method according to an embodiment of the present invention. After the formation of the glass rod doped with the alkali metal element in the rod formation step S1, in the heat treatment step S2, the glass rod is heat-treated at a predetermined temperature for a predetermined time. As is clear from Example 13, a glass processing step (for example, elongation) that is performed at a predetermined temperature or lower for a predetermined time or less before the heat treatment step S2 may be added. Furthermore, a glass processing step (for example, elongation) may be added after the heat treatment step S2.

As described above, in order to inhibit the formation of voids and crystals, it is important to perform the heat treatment step S2. Furthermore, the chlorine concentration in the silica glass doped with the alkali metal element is preferably minimized (100 ppm or less). The heat treatment is preferably performed at about 1000° C. for about 8 to about 20 hours.

What is claimed is:

1. A method for producing an optical fiber preform, comprising:
    a rod formation step of forming a glass rod composed of a silica glass containing an alkali metal element, the average concentration of the alkali metal element being 5 at·ppm or more;
    a heat treatment step of heat-treating the glass rod;
    a core part formation step of forming an alkali metal element-free silica glass layer having a chlorine concentration of 6000 at·ppm or more around the perimeter of the glass rod heat-treated in the heat treatment step to form a core part including the glass rod and the silica glass layer; and a cladding part formation step of forming around the perimeter of the core part a cladding part composed of a silica-based glass having a lower refractive index than the core part, wherein in the heat treatment step, the glass rod is heat-treated at a temperature higher than 800° C. and 1400° C. or lower.

2. The method according to claim 1, wherein in the heat treatment step, the glass rod is heat-treated over a period of 8 hours to 20 hours.

3. The method according to claim 1, wherein in the rod formation step, the glass rod has a chlorine concentration of 400 at·ppm or less.

4. The method according to claim 3, wherein in the rod formation step, the alkali metal element is one element selected from potassium, sodium, rubidium, and cesium.

5. The method according to claim 1, wherein in the rod formation step, the alkali metal element is one element selected from potassium, sodium, rubidium, and cesium.

6. The method according to claim 1, wherein in the core part formation step, the silica glass layer has a chlorine concentration of 6000 at·ppm to 14,000 at·ppm.

7. The method according to claim 1, wherein in the core part formation step, the silica glass layer has a chlorine concentration of 8000 at·ppm to 17,000 at·ppm.

* * * * *